United States Patent
Nagraj Rao et al.

(10) Patent No.: US 12,233,912 B2
(45) Date of Patent: Feb. 25, 2025

(54) EFFICIENT NEURAL NETWORKS

(71) Applicant: Ford Global Technologies, LLC, Dearborn, MI (US)

(72) Inventors: Nikhil Nagraj Rao, Sunnyvale, CA (US); Francois Charette, Tracy, CA (US); Shruthi Venkat, Sunnyvale, CA (US); Sandhya Sridhar, Sunnyvale, CA (US); Vidya Nariyambut Murali, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 505 days.

(21) Appl. No.: 17/571,944

(22) Filed: Jan. 10, 2022

(65) Prior Publication Data

US 2023/0219601 A1 Jul. 13, 2023

(51) Int. Cl.
*B60W 60/00* (2020.01)
*G06V 10/82* (2022.01)
*G06V 20/56* (2022.01)

(52) U.S. Cl.
CPC ......... *B60W 60/0025* (2020.02); *G06V 10/82* (2022.01); *G06V 20/56* (2022.01); *B60W 2556/55* (2020.02); *B60W 2756/10* (2020.02)

(58) Field of Classification Search
CPC ......... B60W 60/0025; B60W 2556/55; B60W 2756/10; G06V 10/82; G06V 20/56; G06V 10/454; G06V 10/764; G06N 3/08; G06N 3/126

See application file for complete search history.

(56) References Cited

U.S. PATENT DOCUMENTS

| | | |
|---|---|---|
| 10,546,389 B2 | 1/2020 | Hillborg |
| 2019/0164290 A1* | 5/2019 | Wang ................... G06N 3/08 |
| 2019/0332109 A1* | 10/2019 | Kolouri ............... G06N 3/044 |
| 2023/0215184 A1* | 7/2023 | Fay ..................... G06V 10/25 |

FOREIGN PATENT DOCUMENTS

| | | |
|---|---|---|
| WO | 2017084186 A1 | 5/2017 |
| WO | 2021016590 A1 | 1/2021 |
| WO | 2021043193 A1 | 3/2021 |

OTHER PUBLICATIONS

Rosebrock, Adrian, Measuring Distance Between Objects in an Image with OpenCV, 2016, pyimagesearch.com (Year: 2016).*
Hyatt, Kyle, Chevy's Advanced Trailering System brings new tech to towing, 2018, CNET.com (Year: 2018).*
Arc, Convolutional Neural Network an Introduction to Convolutional Neural Networks, 2018, towardsdatascience.com (Year: 2018).*

* cited by examiner

*Primary Examiner* — Aniss Chad
*Assistant Examiner* — Chase L Cooley
(74) *Attorney, Agent, or Firm* — Frank A. MacKenzie; Brooks Kushman P.C.

(57) ABSTRACT

A location of a first object can be determined in an image. A line can be drawn on the first image based on the location of the first object. A deep neural network can be trained to determine a relative location between the first object in the image and a second object in the image based on the line. The deep neural network can be optimized by determining a fitness score that divides a number of deep neural network parameters by a performance score. The deep neural network can be output.

20 Claims, 9 Drawing Sheets

EFFICIENT NEURAL NETWORKS

BACKGROUND

Images can be acquired by sensors and processed using a computer to determine data regarding objects in an environment around a system. Operation of a sensing system can include acquiring accurate and timely data regarding objects in the system's environment. A computer can acquire images from one or more images sensors that can be processed to determine locations of objects. Object location data extracted from images can be used by a computer to operate systems including vehicles, robots, security, and object tracking systems.

DETAILED DESCRIPTION

A sensing system can acquire data, for example image data, regarding an environment around the system and process the data to determine identities and/or locations of objects. For example, a deep neural network (DNN) can be trained and then used to determine objects in image data acquired by sensors in systems including vehicle guidance, robot operation, security, manufacturing, and product tracking. Vehicle guidance can include operation of vehicles in autonomous or semi-autonomous modes in environments that include a plurality of objects. Robot guidance can include guiding a robot end effector, for example a gripper, to pick up a part and orient the part for assembly in an environment that includes a plurality of parts. Security systems include features where a computer acquires video data from a camera observing a secure area to provide access to authorized users and detect unauthorized entry in an environment that includes a plurality of users. In a manufacturing system, a DNN can determine the location and orientation of one or more parts in an environment that includes a plurality of parts. In a product tracking system, a deep neural network can determine a location and orientation of one or more packages in an environment that includes a plurality of packages.

Vehicle guidance will be described herein as a non-limiting example of using a computer to detect objects in an image and determine a vehicle path for operating a vehicle based on the detected object. The image can be of an environment around a vehicle and can include a portion of a vehicle and objects including a trailer coupler and a hitch ball. A trailer coupler is the portion of a vehicle trailer that detachably connects a vehicle trailer to a vehicle by positioning the trailer coupler on a hitch ball connected to the vehicle via a trailer hitch. For example, a computing device in a vehicle can be programmed to acquire one or more images from one or more sensors included in the vehicle and locate objects in the one or more images including a trailer coupler and a hitch ball. The sensors can include video or still image cameras that acquire images corresponding to visible or infrared wavelengths of light. The sensor can be mounted on the vehicle and located to provide a view of the hitch ball and an area around the hitch ball. In some examples the sensor can be included in a traffic infrastructure system and mounted on a structure such as a pole or building and the image and/or object data can be communicated to the vehicle. Sensors can also include lidar sensors, which typically emit infrared wavelengths of light, radar sensors which emit radio waves, and ultrasound sensors which emit sound waves. Lidar, radar, and ultrasound sensors all measure distances to points in the environment.

Advantageously, techniques discussed herein improve the ability of a computing device to identify and locate objects by decreasing the time and computing resources required to determine objects in image data by adding fiducial lines to images. In addition, time and computing resources required to determined objects can be reduced by optimizing a DNN used to locate an object using a genetic algorithm as will be described below in relation to FIGS. 2-5.

Disclosed herein is a method, including determining a location of a first object in an image, drawing a line on the image based on the location of the first object, training a deep neural network to determine a relative location between the first object in the image and a second object in the image based on the line and optimizing the deep neural network by determining a fitness score that divides a plurality of deep neural network parameters by a performance score. The method further includes a second computer in a vehicle, wherein the deep neural network is output to the second computer in the vehicle. The second computer can include a second processor and a second memory, the second memory including second instructions executable by the second processor to operate the vehicle based on acquiring a second image and inputting the second image to the deep neural network included in the second computer to determine a vehicle path. The second computer can control one or more of vehicle powertrain, vehicle steering, and vehicle brakes to operate the vehicle on the vehicle path determined based on the deep neural network. The relative location between the first object in the image and the second object in the image can be determined based on the line includes the second object being located on the line.

The location of the first object can be determined by inputting the image to a second deep neural network. The line can include a pattern of light pixels and dark pixels. The first object can be a hitch ball attached to a vehicle and the second object is a trailer coupler. The line can be drawn between the hitch ball and the vehicle. The line can be drawn based on the location of the first object. The deep neural network can be a convolutional neural network that includes convolutional layers and fully connected layers. The deep neural network parameters can include convolutional parameters including one or more of a plurality of convolutional filters, an activation type, a pooling type, and a number of neurons. The deep neural network parameters can include fully connected parameters including an activation type and a number of neurons. Training the deep neural network can include determining a loss function based on comparing output results from the deep neural network with ground truth corresponding to images included in a training dataset.

Further disclosed is a computer readable medium, storing program instructions for executing some or all of the above method steps. Further disclosed is a computer programmed for executing some or all of the above method steps, including a computer apparatus, programmed determine a location of a first object in an image, draw a line on the image based on the location of the first object, train a deep neural network to determine a relative location between the first object in the image and a second object in the image based on the line and optimize the deep neural network by determining a fitness score that divides a plurality of deep neural network parameters by a performance score. The method further includes a second computer in a vehicle, wherein the deep neural network is output to the second computer in the vehicle. The second computer can include a second processor and a second memory, the second memory including second instructions executable by the second processor to operate the vehicle based on acquiring a second image and inputting the second image to the deep neural network included in the second computer to determine a vehicle path. The second computer can control one or more of vehicle powertrain, vehicle steering, and vehicle brakes to operate the vehicle on the vehicle path determined based on the deep neural network. The relative location between the first object in the image and the second object in the image can be determined based on the line includes the second object being located on the line.

The instructions can include further instructions to determine the location of the first object by inputting the image to a second deep neural network. The line can include a pattern of light pixels and dark pixels. The first object can be a hitch ball attached to a vehicle and the second object is a trailer coupler. The line can be drawn between the hitch ball and the vehicle. The line can be drawn based on the location of the first object. The deep neural network can be a convolutional neural network that includes convolutional layers and fully connected layers. The deep neural network parameters can include convolutional parameters including one or more of a plurality of convolutional filters, an activation type, a pooling type, and a number of neurons. The deep neural network parameters can include fully connected parameters including an activation type and a number of neurons. Training the deep neural network can include determining a loss function based on comparing output results from the deep neural network with ground truth corresponding to images included in a training dataset.

Figure 1:
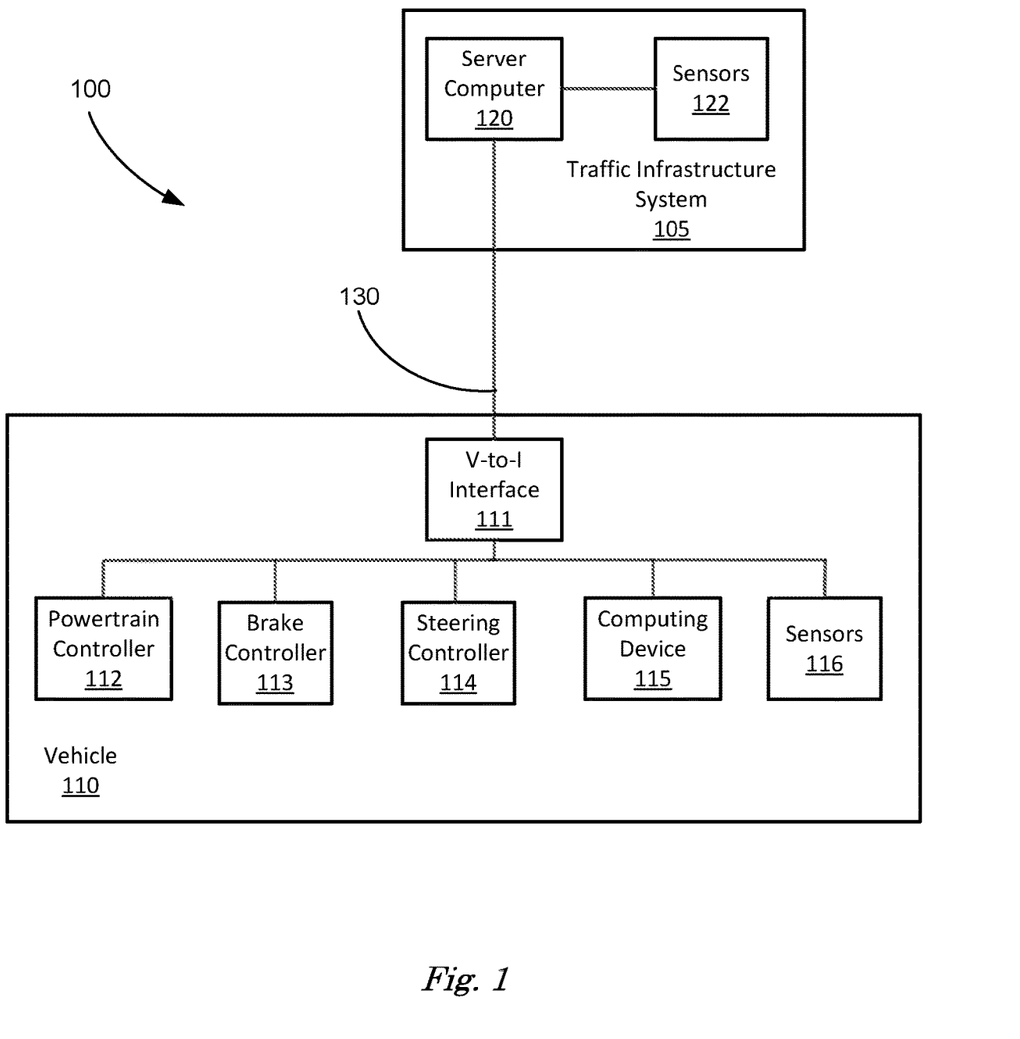
FIG. 1 is a block diagram of an example traffic infrastructure system.

FIG. 1 is a diagram of a sensing system 100 that can include a traffic infrastructure system 105 that includes a server computer 120 and stationary sensors 122. Sensing system 100 includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/ or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
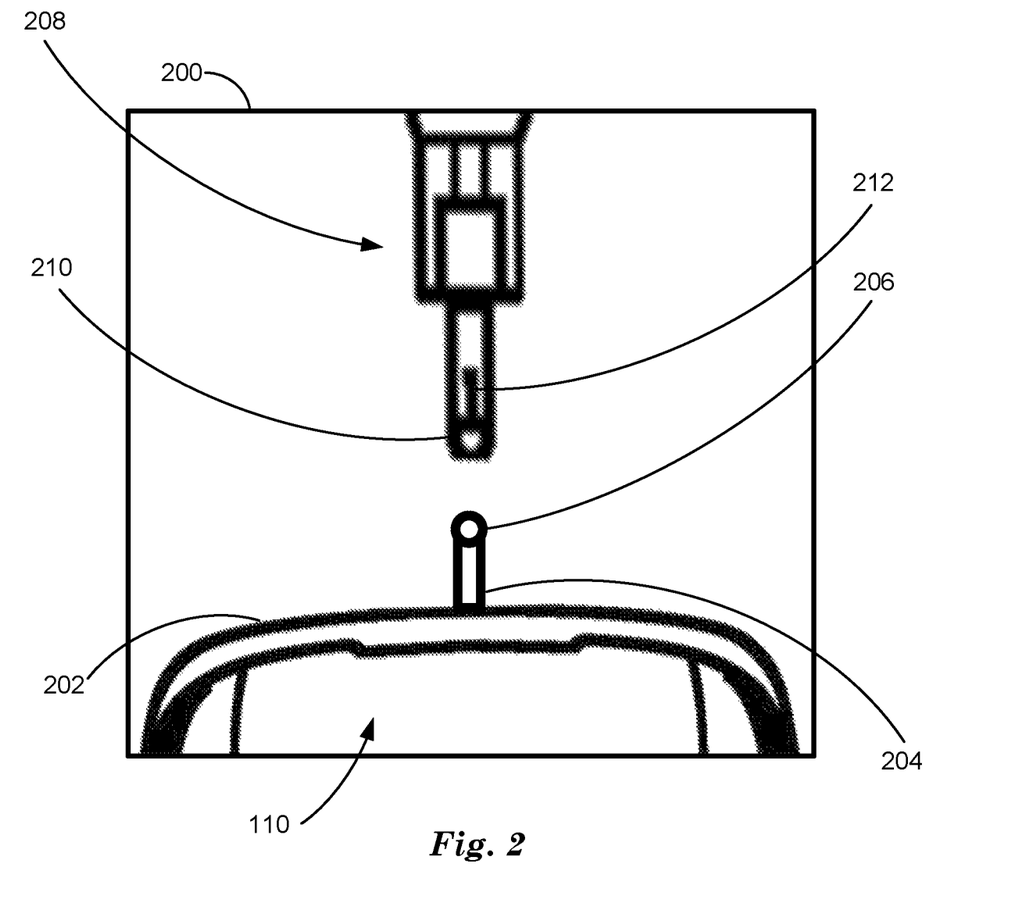
FIG. 2 is a diagram of an example image including features in an environment around a vehicle, including a trailer hitch.

FIG. 2 is a diagram of an image 200 including features of an environment around a vehicle 110. Image 200 includes the rear bumper 202 portion of a vehicle 110, a trailer hitch 204 attached to vehicle 110 and a hitch ball 206 attached to the trailer hitch 204. Image 200 also includes a portion of a trailer 208 including a trailer coupler 210. Trailer 208 can be removably attached to vehicle 110 by operating vehicle 110 using vehicle powertrain, vehicle steering, and/or vehicle brakes to position the hitch ball 206 underneath trailer coupler 210. When hitch ball 206 is positioned underneath trailer coupler 210, trailer 208 can be lowered to engage trailer coupler 210 with hitch ball 206. When trailer coupler 210 is lowered to engage with hitch ball 206, coupler lock 212 can be engaged to lock the trailer coupler 210 to the hitch ball 206. Software executing on computing device 115 or server computer 120 can acquire sensor data including images 200 and radar data and determine locations of a hitch ball 206, a trailer coupler 210 and a relative location of the hitch ball 206 to trailer coupler 210. The locations of the hitch ball 206, the trailer coupler 210 and the relative location of the hitch ball 206 to trailer coupler 210 can be measured in global coordinates. Global coordinates can be determined with respect to a coordinate system such as latitude, longitude, and altitude, for example. The locations of the hitch ball 206, the trailer coupler 210 and the relative location of the hitch ball 206 to trailer coupler 210 can be measured as x, y coordinates in a plane parallel to the roadway or surface that supports the vehicle 110 and the trailer 208. These three locations can be used by computing device 115 or server computer 120 to determine a vehicle path that positions the hitch ball 206 underneath trailer coupler 210.

A vehicle path can be described by a polynomial function, sometimes called a path polynomial, determined based on the locations of the hitch ball 206, the trailer coupler 210 and the relative location of the hitch ball 206 and trailer coupler 210. The path polynomial can be determined by an equation with the form:

$$y = a_i x^i + \ldots + a_2 x^2 + a_1 x + a_0 \quad (1)$$

where x and y are distances measured in a plane parallel to the drivable surface of a roadway and are typically measured in global coordinates determined based on degrees of latitude and longitude, for example. The value of i can be predetermined to limit the number of coefficients to be calculated based on a distance to be traveled by vehicle 110 and predetermined limits on rates of change in vehicle 110 direction and speed. For example, the polynomial function can be determined based on upper and lower limits for lateral and longitudinal accelerations. The polynomial coefficients $a_1$, $a_2$, $a_1$, $a_0$ can be obtained by curve fitting, for example using least-squares techniques, wherein the polynomial equations are fit to at least i+1 cardinal points associated with the locations of the hitch ball 206, the trailer coupler 210 and the relative location of the hitch ball 206 to the trailer coupler 210. The cardinal points can be associated with starting and ending points of the vehicle path, changes in direction in a vehicle path, or at predetermined intervals along a vehicle path, for example. Vehicle 110 can be operated along the vehicle path by computing device 115 issuing commands to one or more of vehicle powertrain, vehicle steering and vehicle brakes via controllers 112, 113, 114 to position hitch ball 206 underneath trailer coupler 210.

The locations of the hitch ball 206, the trailer coupler 210 and the relative location of the hitch ball 206 and trailer coupler 210 can be determined in a plurality of images 200 by inputting the plurality of images 200 into a recurrent neural network (RNN) type of DNN. Because of variability in the appearance of the hitch ball 206 and trailer coupler 210 in images 200 and movement of the vehicle 110 while the images 200 are being acquired an RNN, which uses both spatial and temporal data to determine object locations in image data, can be used to determine the locations of the hitch ball 206, the trailer coupler 210 the relative location of the hitch ball 206 and trailer coupler 210. An RNN includes memory and data paths that connect a plurality of DNNs, where a DNN is instanced for each of a plurality of images 200 input to the RNN. An RNN can thus generate results based on processing images 200 acquired before and after a given image 200. Examples of RNN processing include natural language understanding where the meaning of a given word can depend upon other words occurring in a sentence either before or after the given word.

An RNN trained to determine the locations of the hitch ball 206, the trailer coupler 210 and the relative location of the hitch ball 206 and trailer coupler 210 can require tens of millions of parameters. An RNN with tens of millions of parameters is too large to permit the RNN to be stored in memory and executed on the types of computing devices 115 such as ECUs typically included in vehicles 110. In addition, the time required to process a plurality of input images 300 on an RNN with tens of millions of parameters means that an RNN cannot achieve real time performance in a vehicle 110. Real-time performance is when a result is available from the RNN within a fixed number of milliseconds (ms) from the time the plurality of images 300 are acquired, for example 100 ms.

A technique for overcoming the limitations of RNN-based solutions to the problem of locating a hitch ball 206, a trailer coupler 210 and a relative location of the hitch ball 206 and trailer coupler 210 includes, as explained herein, an Enet DNN architecture. An Enet DNN architecture is a lightweight neural network architecture specifically designed to determine low-latency or real time solutions. Enet DNNs have a plurality of parallel data paths, where a single main computational branch is accompanied by parallel extensions that include convolutional kernels separate from the main computational branch. An Enet DNN can be trained to locate one of a hitch ball 206, a trailer coupler 210 or a relative location of the hitch ball 206 and trailer coupler 210 using about 0.39 million parameters. Post-processing heuristics based on image processing techniques can then be applied to the output of the Enet DNN to determine the values of the other two locations relative to the location determined by the Enet DNN.

Figure 3:
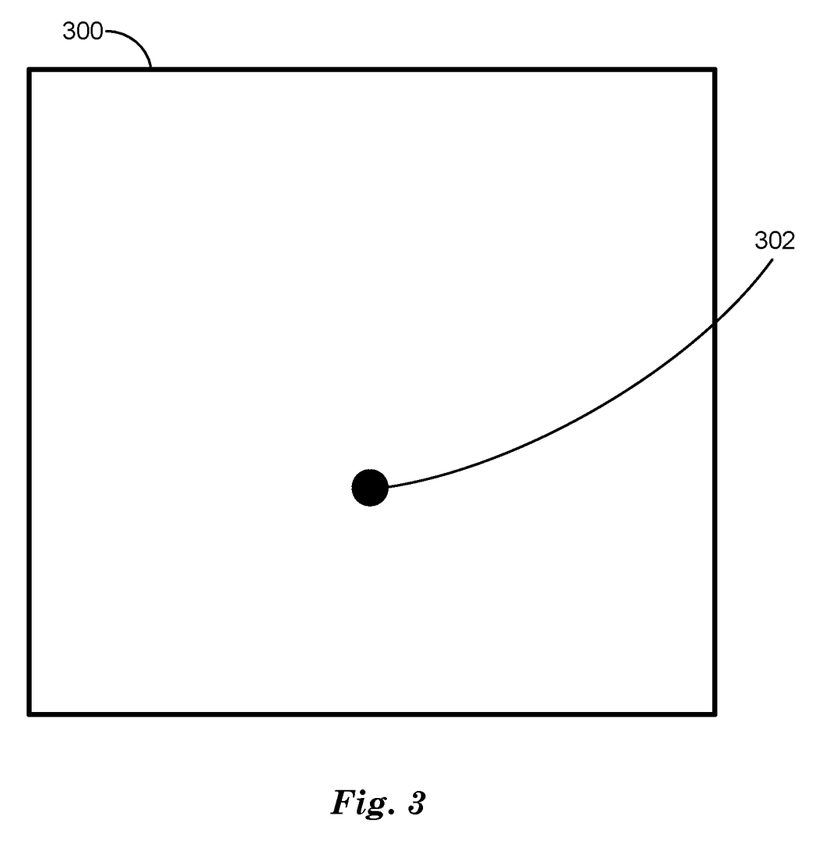
FIG. 3 is a diagram of an example segmented image of a trailer hitch.

FIG. 3 is a diagram of an image 300 with a segment 302 corresponding to the location of the hitch ball 206 from image 200 in FIG. 2. Image segmentation is when a contiguous region of pixels is labeled as corresponding to the location of an object in an image 200. To determine a location corresponding to either a hitch ball 206, a trailer coupler 210 or a relative location of the hitch ball 206 and trailer coupler 210, the Enet DNN first performs image segmentation on an input image 200 to determine a segment 302 corresponding to the hitch ball 206 from image 200. The segmented image 300 can be output by the Enet DNN as a portion of the data output in response to an input image 200.

Figure 4:
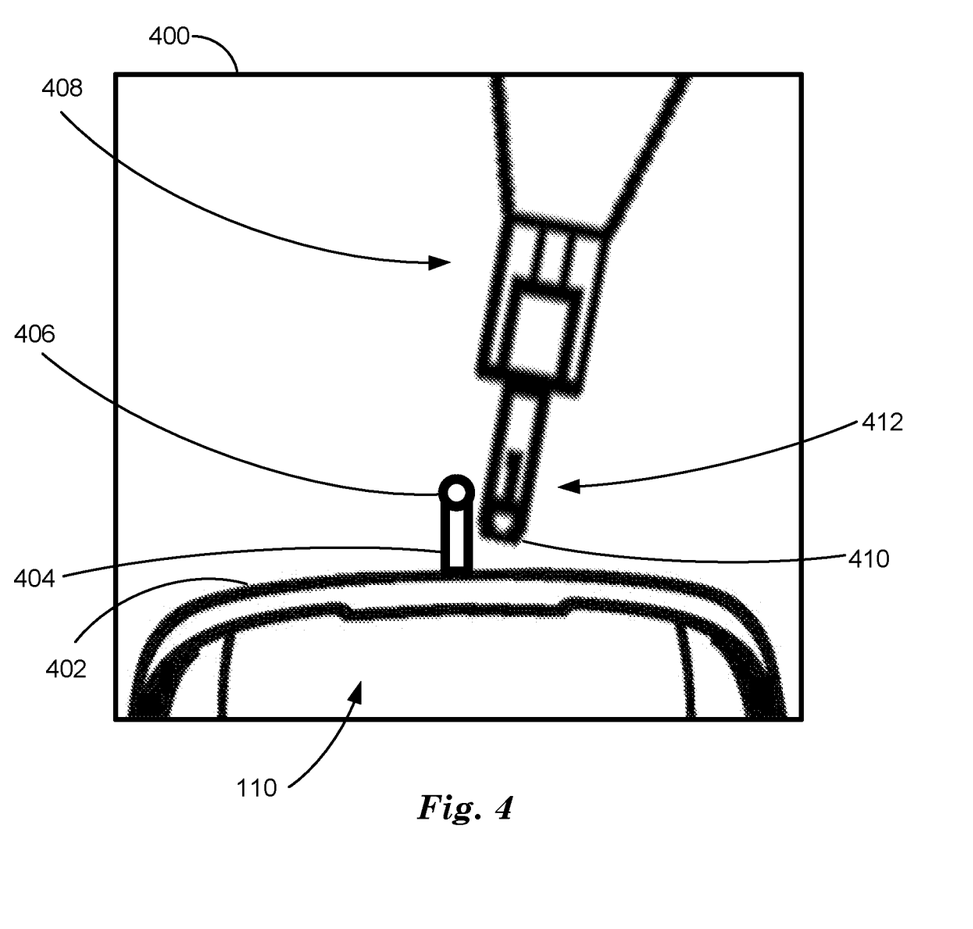
FIG. 4 is a diagram of another example image of a trailer hitch.

FIG. 4 is a diagram of an image 400 that includes overshoot 412. Overshoot 412 is when a trailer coupler 410 of a trailer 408 travels past a hitch ball 406 attached to a hitch 404. When a trailer coupler 410 overshoots 412 a hitch ball 406, the trailer coupler 410 will be closer to bumper 402 than the hitch ball 406. During overshoot 412, the interaction between the trailer coupler 410 and the hitch ball 406 within the Enet DNN results in disruption in the hitch ball 406 segmentation output from the network. Disruption caused by overshoot 412 can result in a segment 302 corresponding to hitch ball 406 having an irregular shape and can result in an erroneous estimate of the location of the hitch ball 406. As a post-processing step, this disruption can be quantified and utilized to infer the trailer coupler 410 location and its location relative to the hitch ball 406 using heuristics. For example, image processing techniques can be used to compare the shape of a segment 302 with a segment 302 produced from an image 200 without overshoot and determine a corrected location of hitch ball 406. The corrected location of hitch ball 406 can be combined with a determined location of the trailer coupler 410 to determine a relative location for the hitch ball 406 and the trailer coupler 410.

While post-processing using image processing software can perform well on certain cases and on devices with good computational power, limited memory and limited computational power available on typical computing devices 115 included in a vehicle 110 can prevent post-processing image processing software from being able to determine the location of a trailer coupler 410 and the location of the trailer coupler 410 relative to the hitch ball 406 in in some examples. To process the image 400 in real time using post-processing image processing software it can be necessary to perform quantization to have it run on a typical vehicle computing device 115 at a good frame rate, based on the size of the Enet DNN. Quantization is a process for reducing the size of input data by representing a contiguous group of data values by a single data value. For example, a series of 8-bit numbers corresponding to 256 different data values can be represented by a series of 4-bit numbers corresponding to 16 different data values thus saving memory and computation time. Quantization can be applied to images 400 in one or more of the x, y, or z axes. Quantizing an image 400 processed by the Enet DNN can result in a considerable reduction (about 20%) in accuracy of the determined locations as compared to a full resolution image 400.

Figure 5:
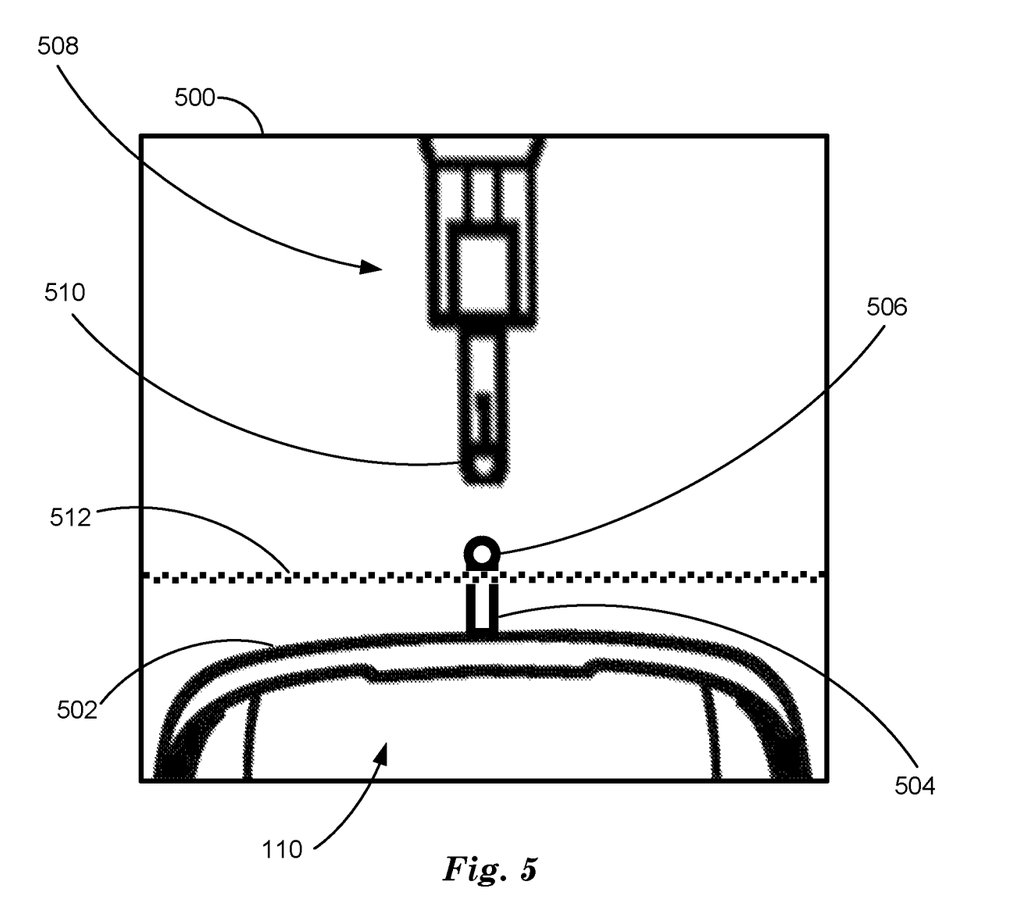
FIG. 5 is a diagram of another example image of a trailer hitch.

FIG. 5 is a diagram of an image 500 including a vehicle 110 including a bumper 502, a hitch 504 and a hitch ball 506 attached to the hitch 504. Image 500 also includes a trailer 508 and a trailer coupler 510 attached to the trailer 508. As discussed above in relation to FIG. 4, there can be examples of trailer coupler 510 overshoot 412 that cause disruptions and reductions in accuracy. Detection of overshoot 412 and location accuracy determination can be improved by adding a fiducial line 512 to an image 500 and using the fiducial line 512 to detect overshoot 412. Overshoot 412 can be detected by processing an image 500 that includes a fiducial line 512 with a second DNN trained to determine overshoot 412 of a trailer coupler 510 with respect to the fiducial line 512. Inclusion of the fiducial line 512 simplifies the problem space by permitting the use of a binary classification approach. Rather than segmenting images and estimating x, y coordinates of segmented regions, the second DNN can be trained to output a simple TRUE or FALSE condition, i.e., does an image 500 include overshoot 412. Reducing the problem space to a binary classification permits the second DNN to use a much smaller network. Because the problem space is reduced, the second DNN can be optimized to determine the best performance per DNN parameter. Optimization is discussed below in relation to FIG. 7.

The location of hitch ball 506 with respect to the bumper 502 can be determined by Enet DNN or image processing software prior to the introduction of a trailer 508 and a trailer coupler 510 into the field of view of a camera included in vehicle 110 acquiring the image 500, for example. Because the camera acquiring the image 500 is in a fixed position with respect to vehicle 110, the locations of hitch ball 506 and bumper 502 will not change in subsequent images 500 acquired by the camera. Fiducial line 512 can be drawn on image 500 using image processing software such as Photoshop, available from Adobe, Inc. San Jose, CA 95110.

A fiducial line 512 can be drawn as illustrated in image 500 with a space cushion from the hitch ball 506 location and the bumper 502. The fiducial line 512 can be drawn with a checkerboard pattern including dark pixels and light pixels in order to make it visible to the second DNN during shadow and bright light conditions. Moreover, the checkerboard pattern helps the second DNN determine the location of this line. The second DNN determines the location of the trailer coupler 510 with respect to the fiducial line 512 and outputs a binary value equal to TRUE if the trailer coupler 510 has crossed the line and FALSE if it has not. The width of the line is a trade-off between visibility and performance. Too wide a line will mask underlying image information while too thin a line will make it hard for the network to localize the line. A width of 2 pixels was determined to be optimal.

Correctly locating the fiducial line 512 in an image 500 can depend upon correct determination of the location of the hitch ball 506 in image 500. Incorrectly locating the fiducial line 512 too close to the bumper 502 can be avoided by incorporating a limit to prevent the fiducial line 512 from being drawn on the bumper 502. Because the camera location is constant with respect to the bumper 502 for a particular vehicle 110, the number of rows of pixels at the bottom of the image 500 that contain the bumper 502 are constant. For example, the bottom 50 rows of pixels in an image 500 can be determined to include the bumper 502. A limit equal to the bottom 50 rows of pixels can be set and the image processing software can be instructed to never draw the fiducial line 512 in the bottom 50 rows of pixels. Preventing the fiducial line from being drawn in the bottom 50 rows of pixels may prevent a collision between the trailer coupler 510 the bumper 502 thus satisfying the overshoot 412 requirement even when the hitch ball 506 location input is erroneous.

Determining overshoot 412 using a fiducial line 512 simplifies the problem space by permitting the use of a binary classification approach. Binary classification is a much simpler task than segmentation as discussed above in relation to FIG. 2. Using binary classification to determine overshoot permits a much smaller, faster second DNN to be used rather than an RNN. Because the second DNN can operate on full-resolution image 500 data in real time, more accurate data is available more quickly for operating a vehicle 110 using fewer computing resources than an approach that employs an RNN.

Figure 6:
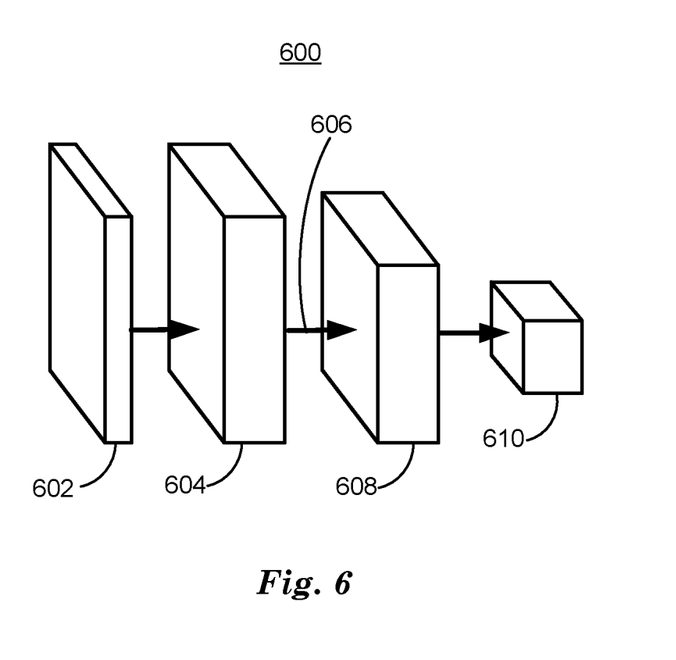
FIG. 6 is a diagram of an example deep neural network.

FIG. 6 is a diagram of the second DNN 600. Second DNN 600 inputs an image 602. Image 602 is input to convolutional layers 604 which convolve the input image 602 using a plurality of convolutional kernels and output latent variables 606 to fully connected layers 608. Fully connected layers 608 process the latent variables 606 with a plurality of linear and/or non-linear algebraic functions to determine a binary output results 610 (TRUE/FALSE) corresponding to the overshoot 412 condition present in the input image 602.

Second DNN 600 is trained using a training dataset that includes a plurality of input images 602 and user determined ground truth corresponding to the input images 602. Ground truth includes the correct answer regarding overshoot 412 included in a particular image 602. During training, parameters corresponding to the convolution kernels and algebraic functions can be randomly selected and an input image 602 is processed to determine a binary output results 610. The binary output results 610 can be compared to the ground truth corresponding to the input image 602 and a loss function can be determined. The loss function is input to the convolutional layers 604 and fully connected layers 608 to select parameters for the convolution kernels and algebraic functions that result in the best correspondence between the binary output results 610 and ground truth, thus training the second DNN 600. Training the second DNN 600 can include both training and testing. Training and testing the second DNN 600 can include dividing a dataset of images 500 and corresponding ground truth into two portions, a training dataset and a testing dataset. The second DNN 600 can be trained using the training dataset as discussed above and then tested using the testing dataset. Testing includes comparing the binary output results 610 with the corresponding ground truth to determine whether the second DNN 600 has output the correct result. The second DNN 600 is scored based on the percentage of correct results. If the percentage of correct results is less than a user selected level, for example 99%, a second dataset of images 500 and ground truth can be used to re-train and re-test the second DNN 600. The re-training and re-testing process can repeat until the second DNN achieves the user selected level of correct results.

Once the second DNN 600 is trained to produce correct results, a genetic algorithm can be applied to the second DNN 600 to optimize the second DNN 600. Optimization determines a minimal configuration of convolutional layers 604 and fully connected layers 608 that achieve results similar to the fully trained second DNN 600. A genetic algorithm is a heuristics-based search technique that minimizes a function, in this example the second DNN, against a set of constraints mimicking the processes of natural selection and evolution. In this context, the inclusion of the fiducial line 512 greatly simplified the problem and a smaller network can be sufficient to achieve the same level of performance. Because the second DNN network architecture begins as a general-purpose architecture, it is not guaranteed to be the smallest possible architecture that performs well for a given task. A genetic algorithm can be used to determine a network architecture with the least number of parameters that can perform well on a test dataset.

A genome in a genetic algorithm encodes the architecture that it represents. Because the second DNN is a convolutional neural network, the architecture includes convolutional layers 604 followed by fully connected layers 608. The second DNN was limited to a maximum of five convolutional layers 604 and two fully connected layers 608. Each position in the genome corresponds to factors such as the number of filters, stride, the activation, and the type of pooling for a convolutional layer while the genes for the fully connected layers decided the number of neurons in that layer. The genome structure for this example has a genome length of 24 and is illustrated in Table 1.

TABLE 1

Genome structure.

| Gene [0]-Gene [4] Conv 0-4 Number of Filters | Gene [5]-Gene [9] Conv 0-4 Stride | Gene [10]-Gene[14] Conv 0-4 Activation Type | Gene [15]-Gene[19] Conv 0-4 Pooling Type | Gene [20] FC 0 Number of Neurons | Gene [21] FC 0 Activation | Gene [22] FC 1 Number of Neurons | Gene [23] FC 1 Activation |
|---|---|---|---|---|---|---|---|

Genes [0-4], Number of Filters, correspond to the number of convolution kernels for each of the five convolutional layers. The number of filters can take a value of 0 to 128 for convolutional layers one to five and a value of 1 to 128 for the first convolutional layer 604. A filter value of 0 indicates that the convolutional layer 604 should be skipped, so requiring a value of 1 for the first convolutional layer 604 (layer 0) means that at least one convolution will be performed. Genes [5-9], Stride, correspond to the size in pixels of the movement of the convolutional kernels over the input data for the five convolutional layers 602. Stride for the convolutional layers 602 can be set from one to four, meaning that between each pixel and each fourth pixel in an image will have a convolutional kernel applied to it. Genes [10-14], Activation, correspond to a function applied to the output from a layer that conditions the output before inputting to the next convolutional layer 604. Activation can be one of ReLU, Leaky ReLU, or ELU. ReLU is a function that sets negative values to 0. Leaky ReLU sets negative values to a fraction of their values. ELU sets negative values to $\alpha(e^x-1)$, where a is a constant. Genes [15-19], Pooling, correspond to a function that reduces the resolution of output from a convolutional layer 604 before inputting to the next layer. Pooling can be either max pooling, which outputs one value equal to the maximum of a neighborhood of pixels or average pooling, which outputs one value equal to the average of a neighborhood of pixels.

Gene [20], Number of Neurons, corresponds to the number of neurons in the first fully connected layer 608. A neuron corresponds to a single algebraic function and can take any value between 0 and 128. Gene [21], Activation, corresponds to the type of activation for the outputs from the first fully connected layer 608. Activation can be ReLU, Leaky ReLU, or ELU as discussed above. Gene [22], Number of Neurons, corresponds to the number of neurons in the second fully connected layer 608. A neuron corresponds to a single algebraic function and can take any value between 0 and 128. Gene [23], Activation, corresponds to the type of activation for the outputs from the second fully connected layer 608. Activation can be ReLU, Leaky ReLU, or ELU as discussed above.

A genetic algorithm can be evaluated by determining values for the genomes based on the number of parameters and the performance of the network, according to the following fitness function:

$$\text{Fitness} = \frac{N}{F1\ \text{Score}_{test} + \Delta} \qquad (2)$$

Where N is the number of parameters of the network, F1 Score$_{test}$ is the result of testing the second DNN based on a test dataset with a value between 0 and 1, and Δ is a constant to avoid a divide by zero error equal to $e^8$. To minimize the fitness function (2), the genetic algorithm trains and evaluates multiple architectures and iteratively converges to the best performing network with the least number of parameters. The genetic algorithm can be run for a set number of generations with a specific population size. For example, the second DNN converged on a 1200 parameter network with an F1 Score$_{test}$ of 0.98 on the test dataset. This corresponded to about a 300× improvement over the ENet architecture. The converged network did not require any quantization or pruning and was able to run it at 25 frames per second on a typical computing device 115 included in a vehicle 110.

Figure 7:
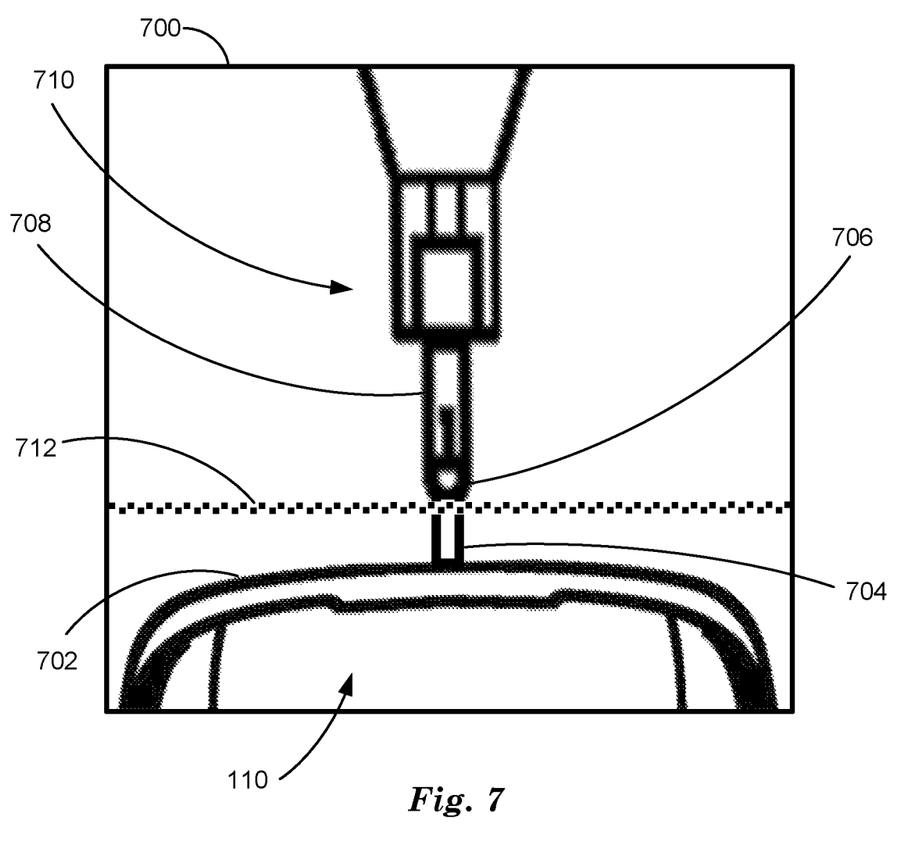
FIG. 7 is a diagram of another example image of a trailer hitch.

FIG. 7 is a diagram of an image 700 of the results of directing the operation of a vehicle 110 to hitch a trailer coupler 708 on a trailer 710 to a hitch ball 706 on a hitch 704 using a fiducial line 712 between the hitch ball 706 and the bumper 702. The location of the trailer coupler 708 with respect to the fiducial line 712 is determined by processing the image 700 with a second DNN trained and optimized as discussed above in relation to FIG. 6. Because the location of the trailer coupler 708 with respect to the fiducial line 712 can be determined at 25 frames per second using limited computing resources available to a typical computing device 115 included in a vehicle 110, a vehicle path that directs the vehicle to position the hitch ball 706 underneath the trailer coupler 708 can be determined in real time. Determining the vehicle path in real time permits the computing device 115 to be able to operate the vehicle 110 by commanding one or more of vehicle powertrain, vehicle steering and vehicle brakes in a smooth and efficient fashion to correctly position the vehicle 110 with respect to the trailer 710 using minimal computing resources.

Figure 8:
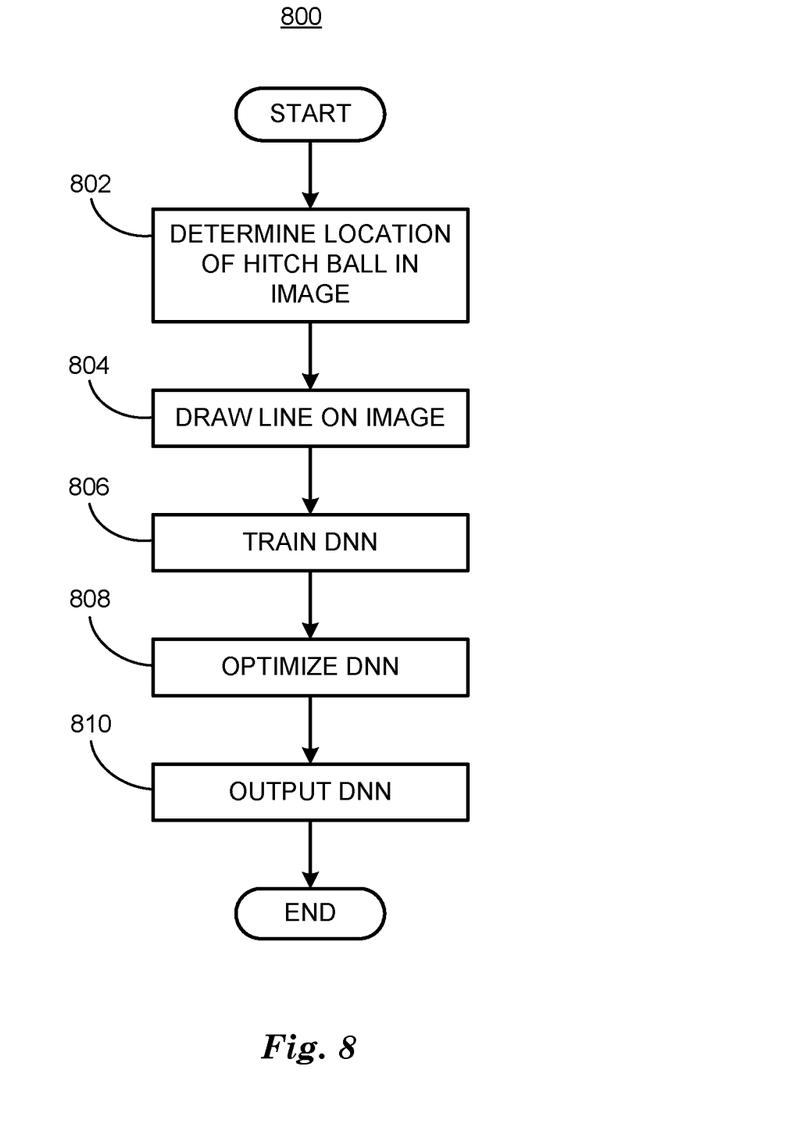
FIG. 8 is a flowchart diagram of an example process to train and optimize a DNN.

FIG. 8 is a diagram of a flowchart, described in relation to FIGS. 1-7, of a process for training and optimizing a second DNN 600 to locate an object with respect to a fiducial line. Process 800 can be implemented by a processor of a computing device 115, taking as input image data from sensors 116, and executing commands, and outputting a trained and optimized second DNN 600. Process 800 includes multiple blocks that can be executed in the illustrated order. Process 800 could alternatively or additionally include fewer blocks or can include the blocks executed in different orders.

Process 800 begins at block 802, where a computing device 115 in a vehicle 110 can determine a location of a first object in an image 500. The first object can be a hitch ball 506 in and image 500 that includes a trailer 508, a trailer coupler 510, a portion of a vehicle 110, a bumper 502 included in the vehicle and a hitch 504. The hitch ball 506 can be determined using image processing software that can include an Enet neural network, for example, as discussed above in relation to FIG. 3.

At block 804 can draw a fiducial line 512 on an image 500 based on the location of a hitch ball 506 determined at block 802. The fiducial line 512 can be drawn on the image to determine when a second object, which can be a trailer coupler 510, overshoots 412 a location of the first object, which can be a hitch ball 506 as discussed above in relation to FIGS. 4 and 5, above.

At block 806 a second DNN 600 can be trained based on a training dataset and a test dataset and corresponding ground truth as discussed above in relation to FIG. 6, above.

At block 808 the second DNN 600 can be optimized based on a genetic algorithm as discussed above in relation to FIG. 6.

At block 810 the second DNN 600 can be output to a computing device 115 included in a vehicle 110. After block 810 process 800 ends.

Figure 9:
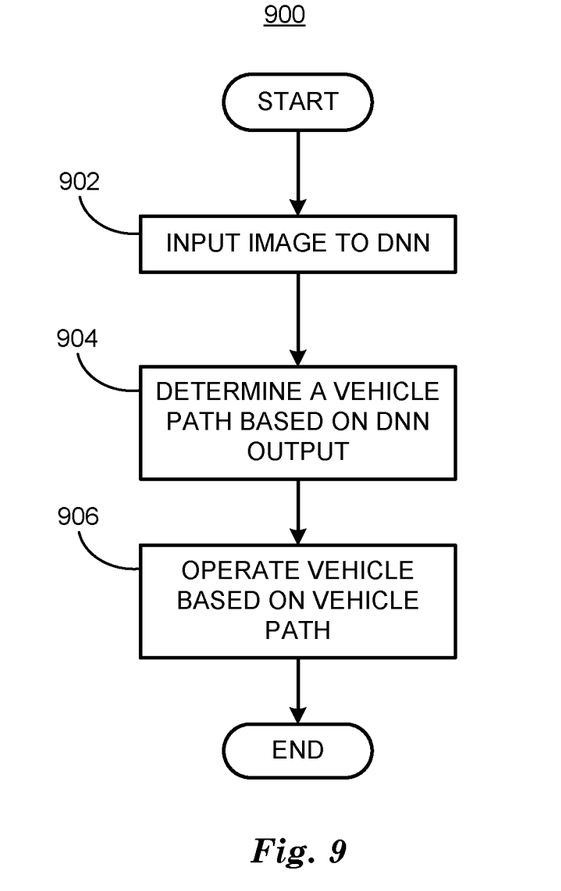
FIG. 9 is a flowchart diagram of an example process to operate a vehicle based on an optimized DNN.

FIG. 9 is a diagram of a flowchart, described in relation to FIGS. 1-8, of a process for operating a vehicle 110 based on determining a vehicle path based on output from a second DNN trained and optimized as discussed in relation to FIG. 8, above. Process 900 can be implemented by a processor of a computing device 115, taking as input data sensors 116, and executing commands, and operating vehicle 110. Process 900 includes multiple blocks that can be executed in the illustrated order. Process 900 could alternatively or additionally include fewer blocks or can include the blocks executed in different orders.

Process 900 begins at block 902, where a computing device 115 in a vehicle 110 inputs an image 500, draws a fiducial line 512 on the image 500 and inputs the image 500 to a second DNN 600 trained and optimized as discussed in relation to FIG. 8, above to determine overshoot 412.

At block 904 computing device 115 determines a vehicle path based on the output from second DNN 600. A vehicle path is a polynomial function that includes maximum and minimum lateral and longitudinal accelerations to be applied to vehicle motion as it travels along the vehicle path. Because second DNN 600 can determine trailer coupler 508 overshoot in real time using limited computer resources, the vehicle path can be determined in real time using computing resources available in typical computing device 115 included in vehicles 110.

At block 906 computing device 115 outputs commands to controllers 112, 113, 114 to control vehicle powertrain, vehicle steering, and vehicle brakes to control vehicle motion to operate vehicle 110 along the vehicle path determined at block 904. Following block 906 process 900 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising a first computer that includes
   a first processor; and
   a first memory, the first memory including first instructions executable by the first processor to:
   determine a location of a first object in an image;
   draw a line on the image based on the location of the first object;
   train a deep neural network to determine a relative location between the first object in the image and a second object in the image based on determining overshoot between the second object and the first object based on the line; and optimize the deep neural network by determining a fitness score that divides a plurality of deep neural network parameters by a performance score.

2. The system of claim 1, further comprising a second computer in a vehicle, the first instructions including instructions to output the deep neural network to the second computer in the vehicle.

3. The system of claim 2, the second computer including a second processor and a second memory, the second memory including second instructions executable by the second processor to operate the vehicle based on acquiring a second image and inputting the second image to the deep neural network included in the second computer to determine a vehicle path.

4. The system of claim 3, the second instructions further including instructions to control one or more of vehicle powertrain, vehicle steering, and vehicle brakes to operate the vehicle on the vehicle path determined based on the deep neural network.

5. The system of claim 1, wherein determining the relative location between the first object in the image and the second object in the image based on the line includes the second object being located on the line.

6. The system of claim 1, the instructions including further instructions to determine the location of the first object by inputting the image to a second deep neural network.

7. The system of claim 1, wherein the line includes a pattern of light pixels and dark pixels.

8. The system of claim 1, wherein the first object is a hitch ball attached to a vehicle and the second object is a trailer coupler.

9. The system of claim 8, wherein the line is drawn between the hitch ball and the vehicle.

10. The system of claim 1, wherein the line is drawn based on the location of the first object.

11. The system of claim 1, wherein the deep neural network is a convolutional neural network that includes convolutional layers and fully connected layers.

12. The system of claim 1, wherein the deep neural network parameters include convolutional parameters including one or more of a plurality of convolutional filters, an activation type, a pooling type, and a number of neurons.

13. The system of claim 1, wherein the deep neural network parameters include fully connected parameters including an activation type and a number of neurons.

14. The system of claim 1, wherein training the deep neural network includes determining a loss function based on comparing output results from the deep neural network with ground truth corresponding to images included in a training dataset.

15. The system of claim 1, wherein the performance score is based on comparing output results from the deep neural network with ground truth corresponding to images included in a training dataset.

16. A method comprising:
determining a location of a first object in an image;
drawing a line on the image based on the location of the first object;
training a deep neural network to determine a relative location between the first object in the image and a second object in the image based on determining overshoot between the second object and the first object based on the line; and
optimizing the deep neural network by determining a fitness score that divides a plurality of deep neural network parameters by a performance score.

17. The method of claim 16, further comprising a second computer in a vehicle, wherein the deep neural network is output to the second computer in the vehicle.

18. The method of claim 17, the second computer including a second processor and a second memory, the second memory including second instructions executable by the second processor to operate the vehicle based on acquiring a second image and inputting the second image to the deep neural network included in the second computer to determine a vehicle path.

19. The method of claim 18, wherein the second computer controls one or more of vehicle powertrain, vehicle steering, and vehicle brakes to operate the vehicle on the vehicle path determined based on the deep neural network.

20. The method of claim 16, wherein determining the relative location between the first object in the image and the second object in the image based on the line includes the second object being located on the line.

* * * * *